United States Patent
Wendeberg et al.

(10) Patent No.: US 7,172,063 B2
(45) Date of Patent: Feb. 6, 2007

(54) GEARSHIFT UNIT FOR MOTOR VEHICLES

(75) Inventors: Staffan Wendeberg, Torslanda (SE);
Robert Broström, Göteborg (SE);
Henrik Boström, Mora (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/707,337

(22) Filed: Dec. 5, 2003

(65) Prior Publication Data

US 2004/0163924 A1 Aug. 26, 2004

Related U.S. Application Data

(63) Continuation of application No. PCT/SE02/01076, filed on Jun. 4, 2002.

(30) Foreign Application Priority Data

Jun. 5, 2001 (SE) .................................... 0101951

(51) Int. Cl.
*B60W 10/10* (2006.01)
*B60W 10/18* (2006.01)

(52) U.S. Cl. .................. 192/220.4; 74/473.24; 74/473.25; 74/473.26; 192/219.4

(58) Field of Classification Search ............... 192/3.63, 192/220.4; 180/336; 74/473.21, 473.24, 74/473.25, 473.26
See application file for complete search history.

(56) References Cited

U.S. PATENT DOCUMENTS

| 4,732,232 | A | 3/1988 | Miyagi et al. | 180/336 |
| 4,823,635 | A | 4/1989 | Selby | 74/524 |
| 6,325,196 | B1 * | 12/2001 | Beattie et al. | 192/220.4 |
| 2003/0085098 | A1 * | 5/2003 | Inoue | 192/220.4 |
| 2003/0098218 | A1 * | 5/2003 | Syamoto | 192/220.4 |

FOREIGN PATENT DOCUMENTS

FR 2752779 A1 3/1998
WO WO 0058646 A1 10/2000

* cited by examiner

*Primary Examiner*—Saul Rodriguez
(74) *Attorney, Agent, or Firm*—Novak Druce & Quigg, LLP

(57) ABSTRACT

A gearshift unit (1) for electronic transmission control in motor vehicles including a gearshift lever housing (4) and a gearshift lever (5) moveable in relation to the gearshift lever housing (4), the gearshift lever being rotatable about a main pivot axis (6) of the gearshift lever (5) within an active position range for active gearshift positions and a neutral position.

26 Claims, 2 Drawing Sheets

GEARSHIFT UNIT FOR MOTOR VEHICLES

CROSS REFERENCE TO RELATED APPLICATIONS

The present application is a continuation patent application of International Application No. PCT/SE02/01076 filed 4 Jun. 2002 which was published in English pursuant to Article 21(2) of the Patent Cooperation Treaty, and which claims priority to Swedish Application No. 0101950-4 filed 5 Jun. 2001. Both applications are expressly incorporated herein by reference in their entireties.

BACKGROUND OF INVENTION

1. Technical Field

The invention relates to a gearshift unit of a so-called shift-by-wire type for motor vehicle; that is to say, a gearshift unit for electronic transmission control. The gearshift unit according to the invention is primarily intended for use in a driver's cab of a truck, but can also be advantageously used in other types of vehicle such as conventional passenger cars, so-called minivans, multi-purpose vehicles (MPVs) and sport-utility vehicles (SUVs). The gearshift unit provides a gearshift unit of the aforementioned type affording a greater safeguard against unintentional exit from the neutral position and one which enables the neutral position to be reached from other gearshift positions without wasting time.

2. Background Art

More and more vehicles are nowadays being equipped with gearshift units intended for electronic transmission control in which various gearshift positions are communicated to the gearbox by electronic signals without the existence of any mechanical clutch. In known gearshift units of this type, it is usual to fit locking units in order to prevent the gearshift lever accidentally leaving the selected gearshift position and to provide a distinct gearshift position in which the driver can feel that the gearshift has assumed its correct position. One problem with the known solutions is that a driver must perform a more complicated operation since, on the one hand, he has to release the locking mechanism, and on the other must find the neutral position in those situations where the neutral position needs to be rapidly engaged. An example of a situation in which the neutral position must be rapidly engaged is where a driver has to correct a skid. Where a manual gearbox is used, the neutral position can be easily obtained by depressing the clutch pedal. There is no corresponding facility in a gearshift unit with electronic transmission control. It is usual, however, to prevent accidental engagement of the reverse gear in that, in the absence of any pressure on a button or its depression by the driver, the gearshift is locked between the neutral and reverse positions. This means, however, that the neutral position cannot be reached directly without additional movements on the part of the driver when the reverse gear is engaged. The time wasted as a result of this lock makes rapid maneuvers more difficult for the driver, which makes the vehicle less comfortable to drive in critical situations.

SUMMARY OF INVENTION

An object of the invention is therefore to provide a gearshift unit for electronic transmission control in which the neutral position can be reached rapidly. Equipping the gearshift unit with a locking unit, which is designed to assume a first locked position when the gearshift is prevented from passing the neutral position, and a second opened position when the gearshift is allowed to pass the neutral position. Locking units are omitted from other active gearshift positions in the gearshift unit which firstly provides a neutral position that is freely accessible from the active gearshift positions solely by rotating the gearshift lever about a main pivot axis without deactivating locking elements. Secondly, a gearshift unit is provided in which the driver can easily find and detect that the gearshift lever has assumed the neutral position, since the neutral position is the position in which the gearshift lever is restrained when turning the gearshift lever. The gearshift lever is thus arranged so that it can rotate about the main pivot axis for forward and return movement along a slot in which the gearshift positions are set out in the usual way.

Locating the gearshift unit in direct proximity to the driver's seat was also previously known in the case of gearshift units for electronic transmission control, it being possible to fold the entire gearshift unit down sideways or to shift it rearwards in order to facilitate access to the sleeping compartment of the cab. A problem with these solutions, however, is that the gearshift unit takes up a considerable amount of space in the cab even in its folded or stowed position, which represents a decided disadvantage in a cab where otherwise optimum use is made of the space. According to a first preferred embodiment, this problem is solved in that the gearshift lever is tiltable, by rotating it about the main pivot axis between the active position range and a tilted position in which the gearshift lever is aligned in or below the seat plane of the driver's seat. This solution permits a very compact gearshift unit construction affording good cab comfort.

Another problem with known solutions is that the drive gear, that is to say the normal gear for driving forwards, can be accidentally engaged by the driver inadvertently knocking the gearshift lever so that it is brought from the neutral position into the drive position. As a result of such accidental engagement of gears, the vehicle can start to move uncontrolledly, presenting a risk both to the driver and his surroundings. According to a preferred embodiment of the invention, this problem is solved in that the locking unit is designed to retain the gearshift lever in the neutral position until the locking unit has assumed a second opened position.

In a preferred embodiment of the invention, the gearshift unit is firmly fixed to a sprung part of the driver's seat.

Furthermore, in the preferred embodiment of the invention the gearshift lever is provided with a pivot pin arranged at a distance from the main pivot axis, the pivot pin, through manipulation of the gearshift lever, being designed to run either in a first, active slot in order to assume active gearshift positions or in a second tilting slot for assuming a tilted position.

In the preferred embodiment of the invention, the active slot is furthermore connected to the tilting slot solely by way of an intermediate neutral position slot, the position of which corresponds to the gearshift neutral position.

In an advantageous embodiment, the pivot pin is designed, by means of spring-loading, to be retained in the neutral position slot when the neutral position has been assumed either from the active slot or from the tilting slot.

The spring-loading is suitably achieved by two spring elements arranged in opposition to one another. The pivot pin is preferably axially displaceable along an axis of symmetry of the gearshift lever.

Furthermore, the pivot pin, at least in one direction, projects essentially at right angles to the axis of symmetry of the gearshift lever.

In a suitable embodiment, the active slot and the tilting slot run essentially radially around the main pivot axis of the gearshift lever.

The gearshift is preferably provided with operating elements for axial displacement of the pivot pin along the axis of symmetry of the gearshift lever, the operating elements being designed to act upon the pivot pin with a force exceeding the spring force from the spring-loading.

According to one embodiment of the invention, the operating elements comprise (include, but are not limited to) a first element for introducing the pivot pin into the active slot so that the gearshift lever can be moved between the active gearshift positions, and a second element for introducing the pivot pin into the tilting slot thereby allowing the gearshift lever to be tilted.

The first element preferably comprises a ramp sloping at an inclined angle towards the axis of symmetry of the gearshift lever, the ramp being rigidly connected to the pivot pin, and a button element, interacting with the ramp and arranged so that it is displaceable essentially at right angles to the axis of symmetry, the ramp and hence the pivot pin being displaced along the axis of symmetry of the gearshift lever when a driver presses the button element against the ramp.

In the preferred embodiment of the invention, a sensor is furthermore designed to detect the pivot pin positions exclusively in the active slot or in the neutral position slot and then to deliver corresponding position signals to the transmission system of the vehicle, so that position signals cannot be emitted when the pivot pin is in the tilting slot.

In an especially preferred embodiment of the invention a logic unit situated in the vehicle is furthermore designed to activate the vehicle parking brake, provided that both of the following conditions are fulfilled: (a) the logic unit receives a first signal from a sensor situated in the gearshift unit, the first signal indicating that the gearshift lever is in its tilted position; and (b) the logic unit receives a second signal from a sensor situated in the vehicle, the second signal indicating that the vehicle is stationary.

BRIEF DESCRIPTION OF DRAWINGS

The invention will be described below through exemplary embodiments, with reference to drawings attached, in which.

DETAILED DESCRIPTION

Figure 1:
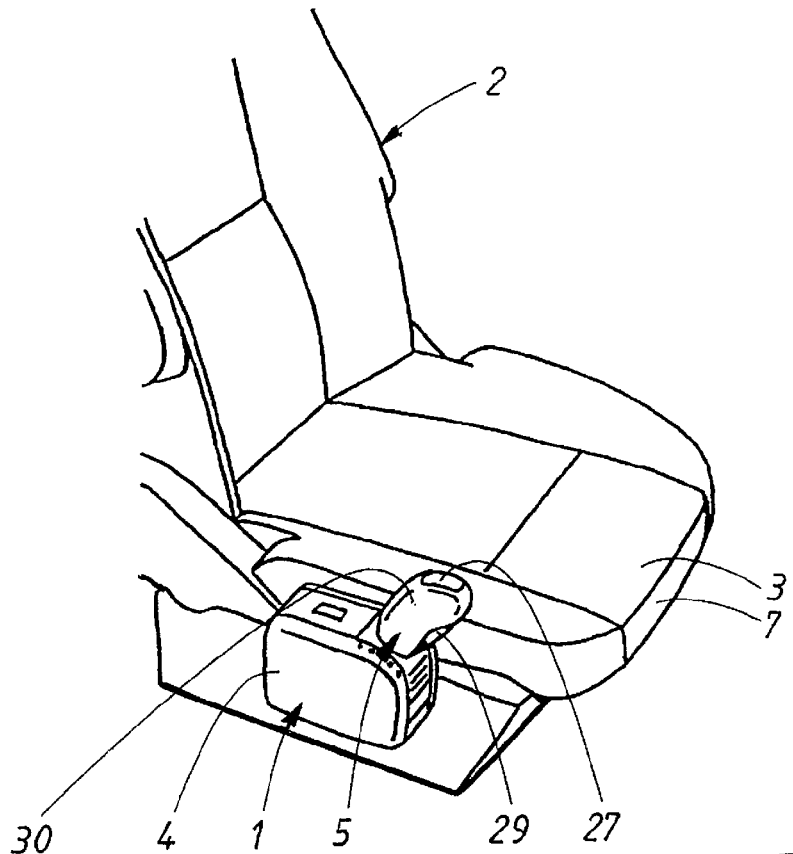
FIG. 1 shows a broken, partial view of a driver's seat provided with a tiltable gearshift lever situated in an active gearshift position and configured according to a preferred embodiment of the invention.

FIG. 1 shows a preferred embodiment of the invention in which the gearshift lever is tiltable. In an alternative embodiment of the invention (not shown), the entire gearshift unit is tiltable. The reference number 1 generally denotes a gearshift unit for a motor vehicle (not shown). In the preferred embodiment of the invention, the gearshift unit 1 is firmly fixed to a sprung part of a driver's seat 2. The sprung part consists of the seat part 3 of the driver's seat 2. In alternative embodiments of the invention (not shown), the gearshift unit 1 may instead be mounted directly on an unsprung driver's seat of the general type used, for example, in passenger cars, or elsewhere in the cab or interior space, for example directly adjoining a center console situated between driver's seat and front passenger seat.

Figure 2:
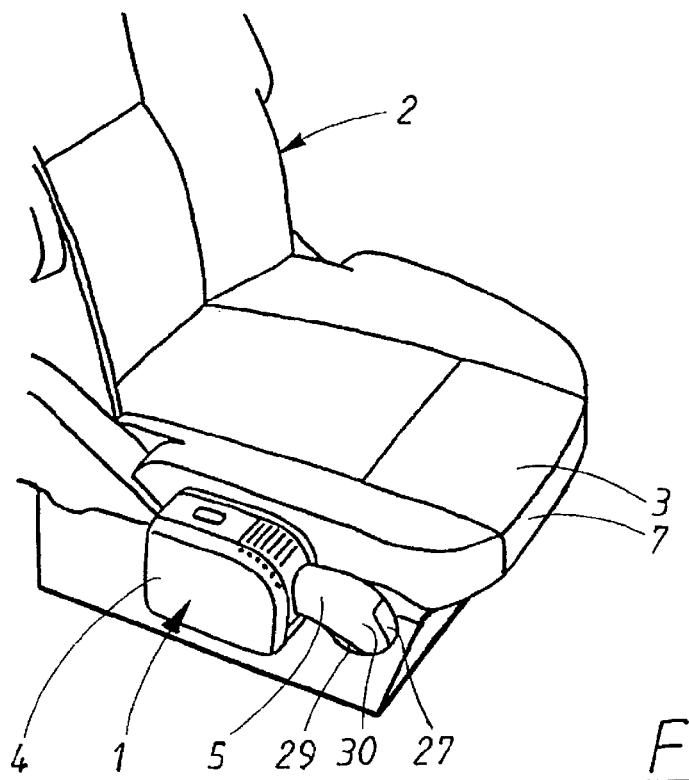
FIG. 2 shows the gearshift unit of FIG. 1, but with the gearshift lever in a tilted position.
Figures 3, 4:
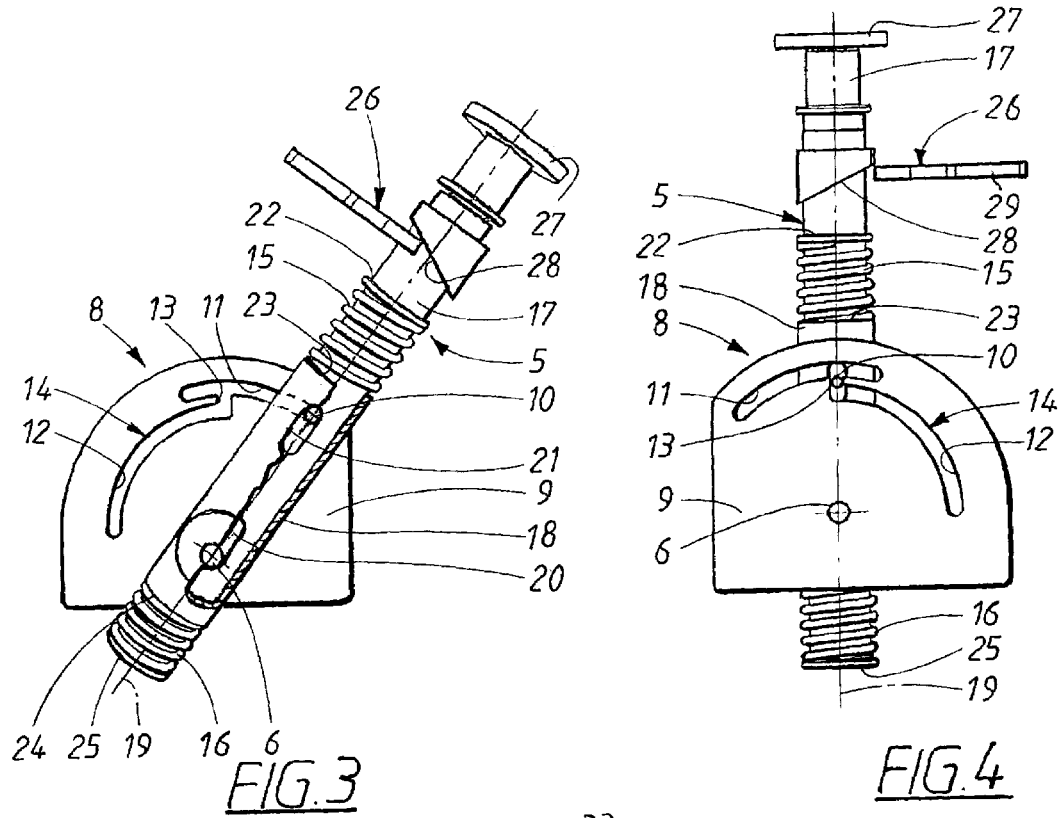
FIG. 3 shows a greatly simplified and partially cut-away view of a gearshift mechanism, configured according to a preferred embodiment of the invention, in an active gearshift position.
FIG. 4 shows the gearshift mechanism as in FIG. 3, viewed from the opposite side, and with the gearshift lever in the neutral position.
Figure 5:
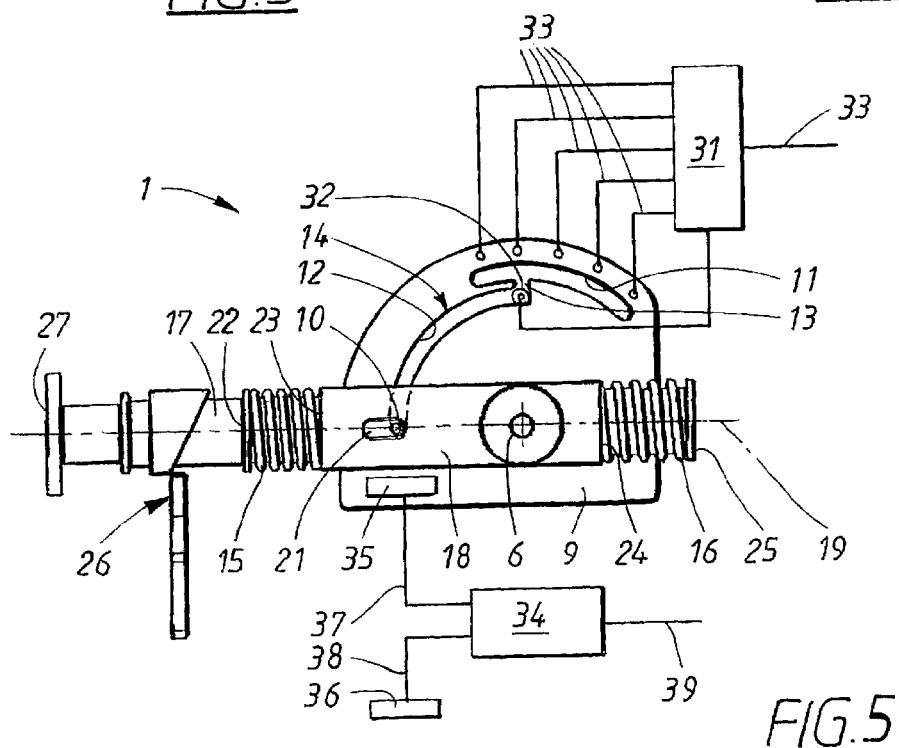
FIG. 5 shows the gearshift mechanism of FIGS. 3 and 4, but with the gearshift lever shown in its tilted position, as well as including diagrammatically represented sensors for delivering gear position signals to the gearbox and for activating the parking brake.

The gearshift unit 1 comprises a gearshift lever housing 4 and a gearshift lever 5. The gearshift lever 5 is supported about a main pivot axis 6 in the gearshift lever housing 4. The main pivot axis 6 is not shown in FIGS. 1 and 2, but is shown in FIGS. 3–5, with reference to which a preferred embodiment of the gearshift unit 1 will be discussed in greater detail hereinbelow. The main pivot axis 6 is essentially aligned in the transverse direction of the vehicle, the gearshift lever 5 being moved forwards or backwards when assuming the various gearshift positions.

The gearshift lever 5 is furthermore arranged so that it can be tilted about the main pivot axis 6 between an active position range for active gearshift positions and a tilted position in which the gearshift lever 5 is aligned horizontally in or below the seat plane of the driver seat 2. The seat plane is represented by the seat part 3 of the driver's seat 2. In FIG. 1, the gearshift lever 5 is shown in a gearshift position in which the gearshift lever 5 is projecting relatively upright from the gearshift lever housing 4. FIG. 2 shows the gearshift lever 5 in a tilted position. In this position, the gearshift lever is tilted forwards in the direction of the vehicle. The length of the gearshift lever 5 is adjusted in such a way that the gearshift lever 5 does not project beyond the leading edge 7 of the seat 2.

The function of a gearshift mechanism 8 configured according to the teachings of the invention will be described in more detail below with reference to FIGS. 3, 4 and 5. The gearshift mechanism 8 is simplified for the sake of clarity. The gearshift mechanism 8 comprises a rod 17, which is pivoted about the main pivot axis 6. The main pivot axis 6 is fixed to a frame 9 firmly connected to the gearshift lever housing 4. The rod 17 is furthermore provided with a pivot pin 10 arranged at a distance from the main pivot axis 6. The pivot pin 10 is designed, through manipulation of the rod 17, to run either in a first, active slot 11 for active gearshift positions or in a second tilting slot 12 for assuming an inactive and tilted position. The active slot 11 is connected to the tilting slot 12 solely by an intermediate neutral position slot 13, the position of which corresponds to the neutral position of the gearshift lever 5. Here, all slots 11, 12, 13 are designed as a connected shifting gate 14 recessed in the frame 9. By means of this design, the gearshift lever 5 can only be tilted into its tilted position from the neutral position, and when the gearshift lever 5 is to be turned up into the active position it can only be turned up into the neutral position.

In FIG. 3, the gearshift lever 5 is shown in an active gearshift position, the pivot pin 10 being situated in the active slot 11 of the shifting gate 14.

The rod 17 is designed, through spring-loading from two centering coil springs 15 and 16 acting in opposition to one another, so that the pivot pin 10 is retained in the neutral position slot 13 when the neutral position is assumed either from the active slot 11 or from the tilting slot 12. The slot 12, the pivot pin 10 and the centering coil springs therefore constitute a locking unit. The neutral position is shown in FIG. 4, in which the rod 17 is locked in the neutral position slot 13 by virtue of the fact that the pivot pin is located between the essentially radially directed surfaces of the intermediate neutral position slot by the two coil springs 15 and 16. The spring-loading may alternatively be provided by spring elements other than the coil springs 15 and 16 shown in the figures, provided that they create a similarly centering action.

In the gearshift unit 8, a cylindrical sleeve 18 is firmly supported around the main pivot axis 6. A central rod 17 is arranged, axially displaceable, in the sleeve. The rod 17 is axially displaceable along an axis of symmetry 19 of the sleeve 18. Since the pivot pin 10 is firmly fixed in the rod 17 and projects therefrom essentially at right angles to the axis of symmetry 19, the pivot pin 10 is therefore also axially displaceable along the axis of symmetry 19. In order to permit this facility for axial displacement on the part of the pivot pin 10, the cylindrical sleeve 18 is provided with an elongated slot 21, which likewise extends in the direction of the axis of symmetry 19. The upper coil spring 15 in relation to the sleeve 18 bears upwardly against an upper step washer 22 and downwardly against the upper end surface 23 of the sleeve 18. The lower coil spring 16 in relation to the sleeve 18 correspondingly bears upwardly against the lower end surface 24 of the sleeve 18 and downwardly against a lower step washer 25. The upper and lower step washers 22, 25, respectively, are firmly fixed to the rod 17.

As can clearly be seen from FIG. 4, the active slot 11 and the tilting slot 12 run essentially along a radius around the main pivot point 6 of the gearshift lever 5. In the preferred embodiment as shown in the figure, the tilting slot 12 runs, in relation to the main pivot axis 6, along a radius radially inside the active slot 11. In an alternative embodiment (not shown), however, the reverse may apply, that is to say the active slot 11 runs, in relation to the main pivot axis 6, radially inside the tilting slot 12.

The gearshift unit 8 is further provided with operating elements 26, 27 for axial displacement of the pivot pin 10 along the axis of symmetry 19 of the sleeve 18. The operating elements 26, 27 comprise a first element 26 for introducing the pivot pin into the active slot 11, so that the gearshift lever 5 can be moved between active gearshift positions, and a second element 27 for introducing the pivot pin 10 into the tilting slot 12, thereby allowing the gearshift lever 5 to be tilted.

The first element 26 comprises a ramp 28 sloping at an inclined angle towards the axis of symmetry 19 of the gearshift lever 5, the ramp being rigidly connected to pivot pin 10. The first element 26 furthermore has a button element 29 interacting with the ramp 28. The button element 29 is arranged so that it is displaceable essentially at right angles to the axis of symmetry 19 of the sleeve 18, the ramp 28 and hence the pivot pin 10 being displaced along the axis of symmetry 19 of the gearshift lever 5 when the button element 29 is pressed against the ramp 28. The second element 27 consists of a pushbutton, which acts on the upper end of the rod 17. It can furthermore be seen from FIG. 1 and 2 that the gearshift lever 5 is externally provided with an ergonomically shaped knob casing 30, which encloses the rod 17. The knob casing is not shown in FIGS. 3, 4 and 5.

The gearshift unit 8, as can be seen from FIG. 5, comprises a control unit 31, which has a sensor 32 intended to detect whether or not the pivot pin is situated in the tilting slot located in connection with the active slot 11 and the neutral position slot 13. The control unit 31 further comprises separate detection elements 33 for detecting each gearshift position. The control unit 31 hereby prevents position signals being emitted when the pivot pin 10 is situated in the tilting slot 12. All position signals consequently cease as soon as tilting of the gearshift lever 5 commences, so that the risk of accidental detection of an active position when the gearshift lever 5 is tilted can be eliminated.

The gearshift unit 1 is further designed so that it is possible at all times to move the gearshift lever 5 to the neutral position without the driver having to press any button irrespective of which position the gearshift lever 5 happens to be situated in. This characteristic is important for safety reasons, since the driver must be able to rapidly and intuitively bring the gearshift lever 5 into the neutral position in a critical situation. Furthermore, the spring-loading in the neutral position makes it impossible to bring the gearshift lever 5 out of the neutral position without manipulation of the operating elements 26 and 27. This locking mechanism reduces the risk of accidental engagement of a gear. The design of the locking unit in the neutral position slot means that the neutral position can be rapidly reached without operating and releasing mechanical catches, that the neutral position can be rapidly found since the gearshift lever is not allowed to pass the neutral position slot when the gearshift lever is rotated about the main pivot axis 6 towards the neutral position slot, but is instead retained in the neutral position slot by means of a locking unit. The design furthermore means that, without pressing a button, the gearshift lever 5 is locked between neutral position and other gearshift positions, and not simply locked between neutral position and reverse gear, as is the case with previously known solutions. This prevents the possibility of accidentally engaging the drive position.

According to the invention, a logic unit 34 situated in the vehicle is furthermore designed to activate the vehicle parking brake (not shown) provided that both of the following conditions are fulfilled: (a) the logic unit 34 receives a first signal from a sensor situated in the gearshift unit 1, the first signal indicating that the gearshift lever 5 is in its tilted position; and (b) the logic unit 34 receives a second signal from a sensor 36 situated in the vehicle, the second signal indicating that the vehicle is stationary.

In the example shown, the logic unit 34 is connected to the sensors 35 and 36 by means of lines 37 and 38, respectively. If both of the aforementioned conditions are fulfilled, the logic unit 34 emits a signal via an output signal line 39, which activates the parking brake. The brake systems used on trucks are almost exclusively pneumatic or partially pneumatic brake systems, so that the output signal leads to the activation of an electronically controlled valve (not shown), thereby applying pneumatic pressure to the brakes (not shown). The parking brake function according to the invention can either be used alone as primary parking brake activation, or in combination with a conventional parking brake control. The sensor 36 for detecting whether the vehicle is stationary may consist, for example, of known sensors for measuring the speed of the vehicle, the logic unit, instead of communicating directly with a sensor, communicating with a control unit forming part of the vehicle.

The invention is not limited to exemplary embodiments described above and illustrated in the drawings, but can be readily modified without departing from the scope of the patented claims. For example, the two operating elements 26, 27 may be integrally formed in one and the same element, such as a two-way toggle switch.

The invention claimed is:

1. A gearshift unit for electronic transmission control in motor vehicles, said gearshift unit comprising:
   a gearshift lever housing and a gearshift lever moveable in relation to the gearshift lever housing, the gearshift lever being rotatable about a main pivot axis of the gearshift lever within an active position range for active gearshift positions and a neutral position;
   the gearshift unit comprising a locking unit configured to assume a first, locked position when the gearshift lever is prevented from passing the neutral position and a second opened position when the gearshift lever is allowed to pass the neutral position, the active range being defined by an active slot encompassing the active gear positions and the neutral positions, said locking unit including a pivot pin which is arranged to run in said first active slot and a neutral locking position slot into which said pivot pin is forced when said locking unit is not in its second opened position, wherein said active slot is, with exception of said neutral locking position slot, free of mechanical catches whereby the active gearshift positions have no locking units so that the neutral position is freely accessible front the active gearshift positions solely by rotating the gearshift lever about the main pivot axis without deactivating locking elements.

2. The gearshift unit as recited in claim 1, wherein the gearshift lever, by rotation about the main pivot axis, is tiltable between the active position range and a tilted position in which the gearshift lever (5) is aligned in or below the seat plane of the driver's seat (2).

3. The gearshift unit as recited in claim 2, wherein the gearshift lever, in a tilted position, does not have locking units, the neutral position being freely accessible from the tilted position solely by rotating the gearshift lever about the main pivot axis without deactivating locking elements.

4. The gearshift unit as recited in claim 1, wherein the gearshift lever further comprises a rod provided with a pivot pin arranged at a distance from the main pivot axis, the pivot pin being designed, through manipulation of the gearshift lever, to run either in a first, active slot corresponding to the active position range, or in a second tilting slot for assuming a tilted position.

5. The gearshift unit as recited in claim 4, wherein the active slot is connected to the tilting slot solely by way of an intermediate neutral position slot, the position of which corresponds to the neutral position of the gearshift lever.

6. The gearshift unit as recited in claim 5, wherein the locking unit is configured to retain the pivot pin in the neutral position slot when the neutral position is assumed either from the active slot or from the tilting slot through spring-loading of the pivot pin.

7. The gearshift unit as recited in claim 6, wherein the spring-loading is provided by two spring elements opposed to one another.

8. The gearshift unit as recited in claim 7, wherein the pivot pin is axially displaceable along an axis of symmetry of the rod.

9. The gearshift unit as recited in claim 4, wherein the active slot and the tilting slot run essentially radially around the main pivot axis of the gearshift lever.

10. The gearshift unit as recited in claim 4, wherein the gearshift lever is provided with operating elements for axial displacement of the pivot pin along the axis of symmetry of the rod.

11. The gearshift unit as recited in claim 10, wherein the operating element comprises a first element for introducing the pivot pin into the active slot so that the gearshift lever can be moved between the active gearshift positions, and a second element for introducing the pivot pin into the tilting slot, thereby allowing the gearshift lever to be tilted.

12. The gearshift unit as recited in claim 11, wherein the first element comprises a ramp sloping at an inclined angle towards the axis of symmetry, the ramp being rigidly connected to the pivot pin, and a button element, interacting with the ramp and arranged so that it is displaceable essentially at right angles to the axis of symmetry, the ramp and hence the pivot pin—being displaced along the axis of symmetry of the gearshift lever when a driver presses the button element against the ramp.

13. The gearshift unit as recited in claim 5, wherein a sensor is designed exclusively to detect radial positions of the pivot pin so that position signals cannot be emitted when the pivot pin is in the tilting slot.

14. The gearshift unit as recited in claim 1, wherein a logic unit situated in the vehicle is designed to activate the vehicle parking brake, provided that both of the following conditions are fulfilled; (a) the logic unit receives a first signal which indicates that the gearshift lever is in its tilted position; and (b) the logic unit receives a second signal which indicates that the vehicle is stationary.

15. The gearshift unit as recited in claim 1, wherein the gearshift unit is firmly fixed to a sprung part of the driver's seat.

16. The gearshift unit as recited in claim 1, wherein a pivot pin of the gearshift lever engages the continuous slot.

17. The gearshift unit as recited in claim 16, wherein the locking unit comprises a pair of opposing springs used, in the first locked position, to prevent the pivot pin of the gearshift lever from passing the neutral position.

18. The gearshift unit as recited in claim 17, wherein the portion of the continuous slot is a stepped portion.

19. The gearshift unit as recited in claim 1, further comprising a frame connected to the gearshift lever housing, the frame having the continuous slot formed therein.

20. A gearshift unit for electronic transmission control in motor vehicles, said gearshift unit comprising:
   a gearshift lever housing and a gearshift lever moveable in relation to the gearshift lever housing, the gearshift lever being rotatable about a main pivot axis of the gearshift lever within an active position range for active gearshift positions and a neutral position, the gearshift lever, by rotation about the main pivot axis, is tiltable between the active position range and a tilted position in which the gearshift lever (5) is aligned in or below the seat plane of the driver's seat (2); and
   the gearshift unit comprising a locking unit configured to assume a first, locked position when the gearshift lever is prevented from passing the neutral position and a second opened position when the gearshift lever is allowed to pass the neutral position, and the active gearshift positions have no locking units so that the neutral position is freely accessible from the active gearshift positions solely by rotating the gearshift lever about the main pivot axis without deactivating locking elements.

21. A gearshift unit for electronic transmission control in motor vehicles, said gearshift unit comprising:
   a gearshift lever housing and a gearshift lever moveable in relation to the gearshift lever housing, the gearshift lever being rotatable about a main pivot axis of the gearshift lever within an active position range for active gearshift positions and a neutral position; and the gearshift unit comprising a locking unit configured to assume a first, locked position when the gearshift lever is prevented from passing the neutral position and a second opened position when the gearshift lever is allowed to pass the neutral position, and the active gearshift positions have no locking units so that the neutral position is freely accessible from the active gearshift positions solely by rotating the gearshift lever about the main pivot axis without deactivating locking elements, the gearshift lever further comprising a rod provided with a pivot pin arranged at a distance from the main pivot axis, the pivot pin being designed, through manipulation of the gearshift lever, to run either in a first, active slot corresponding to the active position range, or in a second, tilting slot for assuming a tilted position, wherein the active slot is connected to the tilting slot solely by way of an intermediate neutral position slot, the position of which corresponds to the neutral position of the gearshift lever.

22. A gearshift unit For electronic transmission control in motor vehicles, said gearshift unit comprising:

a gearshift lever housing and a gearshift lever moveable in relation to the gearshift lever housing, the gearshift lever being rotatable about a main pivot axis of the gearshift lever within an active position range for active gearshift positions and a neutral position; and the gearshift unit comprising a locking unit configured to assume a first, locked position when the gearshift lever is prevented from passing the neutral position and a second opened position when the gearshift lever is allowed to pass the neutral position, and the active gearshift positions have no locking units so that the neutral position is freely accessible from the active gearshift positions solely by rotating the gearshift lever about the main pivot axis without deactivating locking elements, the gearshift lever further comprising a rod provided with a pivot pin arranged at a distance from the main pivot axis, the pivot pin being designed, through manipulation of the gearshift lever, to run either in a first, active slot corresponding to the active position range, or in a second, tilting slot for assuming a tilted position, wherein the active slot and the tilting slot run essentially radially around the main pivot axis of the gearshift lever.

23. A gearshift unit for electronic transmission control in motor vehicles, said gearshift unit comprising:

a gearshift lever housing and a gearshift lever moveable in relation to the gearshift lever housing, the gearshift lever being rotatable about a main pivot axis of the gearshift lever within an active position range for active gearshift positions and a neutral position; and the gearshift unit comprising a locking unit configured to assume a first, locked position when the gearshift lever is prevented from passing the neutral position and a second opened position when the gearshift lever is allowed to pass the neutral position, and the active gearshift positions have no locking units so that the neutral position is freely accessible from the active gearshift positions solely by rotating the gearshift lever about the main pivot axis without deactivating locking elements, the gearshift lever further comprising a rod provided with a pivot pin arranged at a distance from the main pivot axis, the pivot pin being designed, through manipulation of the gearshift lever, to run either in a first, active slot corresponding to the active position range, or in a second, tilting slot for assuming a tilted position; wherein the gearshift lever is provided with operating elements for axial displacement of the pivot pin along the axis of symmetry of the rod.

24. A gearshift unit for electronic transmission control in motor vehicles, said gearshift unit comprising;

a gearshift lever housing and a gearshift lever moveable in relation to the gearshift lever housing, the gearshift lever being rotatable about a main pivot axis of the gearshift lever within an active position range for active gearshift positions and a neutral position;

the gearshift unit comprising a locking unit configured to assume a first, locked position when the gearshift lever is prevented from passing the neutral position and a second opened position when the gearshift lever is allowed to pass the neutral position, and the active gearshift positions have, no locking units so that the neutral position is freely accessible from the active gearshift positions solely by rotating the gearshift lever about the main pivot axis without deactivating locking elements; and a logic unit situated in the vehicle to activate the vehicle parking brake, provided that both of the following conditions are fulfilled: (a) the logic unit receives a first signal which indicates that the gearshift lever is in its tilted position; and (b) the logic unit receives a second signal which indicates that the vehicle is stationary.

25. A gearshift unit for electronic transmission control in motor vehicles, said gearshift unit comprising:

a gearshift lever housing and a gearshift lever moveable in relation to the gearshift lever housing, the gearshift lever being rotatable about a main pivot axis of the gearshift lever within an active position range for active gearshift positions and a neutral position;

the gearshift unit comprising a looking unit configured to assume a first, locked position when the gearshift lever is prevented from passing the neutral position and a second opened position when the gearshift lever is allowed to pass the neutral position, and the active gearshift positions have no locking units so that the neutral position is freely accessible from the active gearshift positions solely by rotating the gearshift lever about the main pivot axis without deactivating locking elements, wherein the gearshift wilt is firmly fixed to a sprung part of the driver's seat.

26. A gearshift unit fir electronic transmission control in motor vehicles, said gearshift unit comprising:

a gearshift lever housing and a gearshift lever moveable in relation to the gearshift lever housing, the gearshift lever being rotatable about a main pivot axis of the gearshift lever within an active position range for active gearshift positions and a neutral position;

a continuous slot engaged by the gearshift lever in the active position range that includes the active gearshift positions, the continuous slot further including a portion corresponding to the neutral position; and a locking unit configured to assume a first, locked position when the gearshift lever is prevented from passing the neutral position and a second opened position when the gearshift lever is allowed to pass the neutral position, and the active gearshift positions have no locking units so that the neutral position is freely accessible from the active gearshift positions solely by rotating the gearshift lever about the main pivot axis without deactivating locking elements.

* * * * *